US009342876B2

(12) United States Patent
Glazoff et al.

(10) Patent No.: US 9,342,876 B2
(45) Date of Patent: May 17, 2016

(54) METHODS, APPARATUSES, AND COMPUTER-READABLE MEDIA FOR PROJECTIONAL MORPHOLOGICAL ANALYSIS OF N-DIMENSIONAL SIGNALS

(71) Applicant: Battelle Energy Alliance, LLC, Idaho Falls, ID (US)

(72) Inventors: Michael V. Glazoff, Idaho Falls, ID (US); Kevin L. Gering, Idaho Falls, ID (US); John E. Garnier, Idaho Falls, ID (US); Sergey N. Rashkeev, Idaho Falls, ID (US); Yuri Petrovich Pyt'ev, Moscow (RU)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 56 days.

(21) Appl. No.: 13/870,700

(22) Filed: Apr. 25, 2013

(65) Prior Publication Data
US 2014/0321733 A1 Oct. 30, 2014

(51) Int. Cl.
*G06T 7/00* (2006.01)
(52) U.S. Cl.
CPC .......... *G06T 7/00* (2013.01); *G06T 2207/10056* (2013.01); *G06T 2207/20036* (2013.01); *G06T 2207/30136* (2013.01)
(58) Field of Classification Search
CPC . G06T 7/00; G06T 2207/10081; G06T 15/08; G06T 17/10; G06T 2200/04; G06T 2207/30048; G06T 2207/30096; G06T 5/30; G06T 7/0091; G06T 7/602; G06T 2207/30064; G06T 7/0083; G06T 17/00
See application file for complete search history.

(56) References Cited

U.S. PATENT DOCUMENTS

| 7,013,261 | B2 | 3/2006 | Eisele | |
|---|---|---|---|---|
| 7,933,451 | B2* | 4/2011 | Kloer | 382/190 |
| 8,116,551 | B2 | 2/2012 | Gallagher et al. | |
| 8,131,537 | B2 | 3/2012 | Nakayama | |
| 8,266,160 | B2 | 9/2012 | Listou | |
| 8,285,024 | B2 | 10/2012 | Lett et al. | |
| 2003/0202713 | A1* | 10/2003 | Sowa | 382/260 |
| 2004/0109608 | A1* | 6/2004 | Love et al. | 382/224 |
| 2004/0207652 | A1* | 10/2004 | Ratti et al. | 345/697 |
| 2008/0187095 | A1* | 8/2008 | Boone et al. | 378/37 |

(Continued)

OTHER PUBLICATIONS

"Gibbs phenomenon," Wikipedia, <http://en.wikipedia.org/wiki/Gibbs_phenomenon>, Nov. 15, 2010, pp. 1-8.
Barner et al., Ed. "Nonlinear Signal and Image Processing," CRC Press, New York, 2003.

(Continued)

*Primary Examiner* — Jingge Wu
(74) *Attorney, Agent, or Firm* — TraskBritt

(57) ABSTRACT

Embodiments discussed herein in the form of methods, systems, and computer-readable media deal with the application of advanced "projectional" morphological algorithms for solving a broad range of problems. In a method of performing projectional morphological analysis, an N-dimensional input signal is supplied. At least one N-dimensional form indicative of at least one feature in the N-dimensional input signal is identified. The N-dimensional input signal is filtered relative to the at least one N-dimensional form and an N-dimensional output signal is generated indicating results of the filtering at least as differences in the N-dimensional input signal relative to the at least one N-dimensional form.

22 Claims, 11 Drawing Sheets

(56) References Cited

U.S. PATENT DOCUMENTS

| | | | |
|---|---|---|---|
| 2009/0136103 A1* | 5/2009 | Sonka et al. | 382/128 |
| 2010/0322489 A1* | 12/2010 | Tizhoosh et al. | 382/128 |
| 2011/0091078 A1 | 4/2011 | Kherroubi et al. | |
| 2011/0179044 A1 | 7/2011 | Crum et al. | |
| 2011/0311129 A1* | 12/2011 | Milanfar et al. | 382/154 |
| 2012/0045127 A1* | 2/2012 | Song et al. | 382/171 |
| 2012/0257164 A1 | 10/2012 | Zee et al. | |
| 2012/0275658 A1 | 11/2012 | Hurley et al. | |
| 2013/0259336 A1* | 10/2013 | Wakai | 382/130 |
| 2013/0297232 A1* | 11/2013 | Euler et al. | 702/40 |

OTHER PUBLICATIONS

Daubechies, Ingrid, Ed., "Wavelets and Applications, Proceedings of Symposia in Applied Mathematics," vol. 17, Jan. 11-12, 1993.

Evsegneev et al., "Analysis and recognition of piecewise constant texture images," Pattern Recognition and Image Analysis, Jul.-Sep. 2006, vol. 16, No. 3, pp. 398-405.

Pyt'Ev, Yuri, "Morphological Image Analysis, Pattern Recognition and Image Analysis," vol. 3, pp. 19-28, 1993.

Pyt'Ev et al., "A theory of measuring computer systems as a foundation of a new technology of physical research," Computational Mathematics and Modeling, Oct.-Dec. 1995, vol. 6, No. 4, pp. 284-289.

* cited by examiner

FIG. 8

METHODS, APPARATUSES, AND COMPUTER-READABLE MEDIA FOR PROJECTIONAL MORPHOLOGICAL ANALYSIS OF N-DIMENSIONAL SIGNALS

STATEMENT REGARDING FEDERALLY SPONSORED RESEARCH OR DEVELOPMENT

This disclosure was made with government support under Contract No. DE-AC07-05ID14517 awarded by the United States Department of Energy. The government has certain rights in the disclosure.

TECHNICAL FIELD

Embodiments discussed herein relate generally to morphological analysis, and more specifically, to methods and apparatuses for projection morphological analysis of N-dimensional signals.

BACKGROUND

Classical mathematical morphology is a method of nonlinear processing of images (originally) and now also signals, based on filtering of the images with simple geometrical figures. Examples of such figures may include circles, ellipses, squares, rectangles, etc. In general, four fundamental operations used in classical mathematical morphology constitute a "language" of morphological analysis. These fundamental operations are dilation, erosion, opening, and closure.

The application of these operations, as well as selecting the correct length scale(s) for the simple geometrical figures used for filtering, generally requires significant expertise in a variety of mathematical areas such as set theory, lattice theory, topology, and random functions. In order to achieve a desired result, quite often an application of a complex sequence of such operations is required, which makes this approach to "filtering with simple geometrical figures" not only a science, but rather, an art in itself.

General criteria are typically not available classical mathematical morphology formulations related to development of such sequences as well as how to terminate the work of a given algorithm. In addition, classical mathematical morphology was originally developed for binary images and later on generalized for grayscale images. Proposals are presently being made for processing of color images using classical mathematical morphology only now, some 50 years after the discovery of mathematical morphology.

There is a need for methods and apparatuses that use new and different types of mathematical morphological analysis that can be applied in a more straightforward manner and be more generally applied to signals in single and multiple dimensions rather than just 2 dimensions.

BRIEF DESCRIPTION OF THE DRAWINGS

FIG. 8 illustrates a GUI showing an original image of a Zircaloy-4 rod surface and projectional morphological analysis code for analyzing the image;

DETAILED DESCRIPTION

Figure 1:
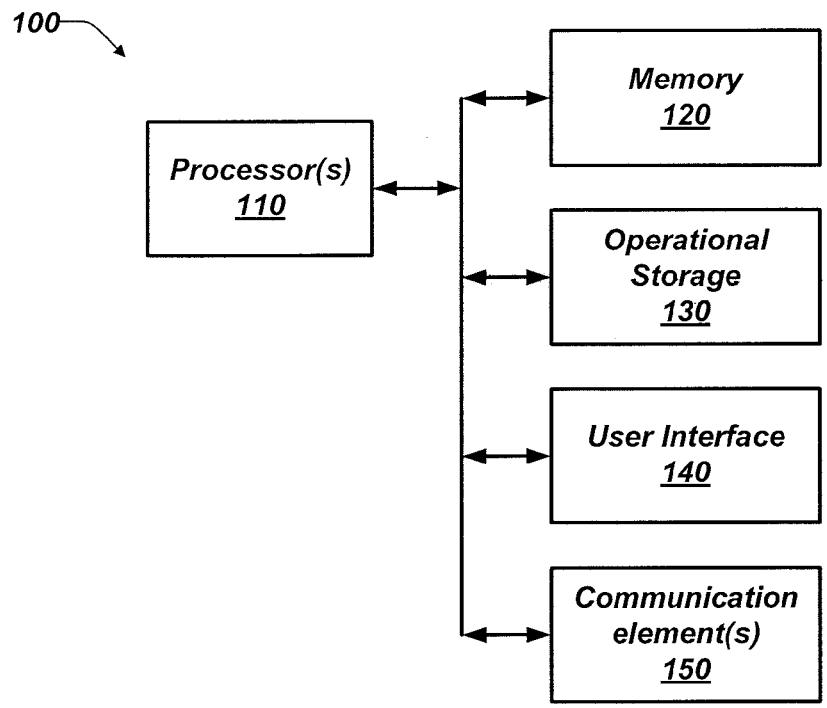
FIG. 1 is a simplified block diagram of a computing system configured for carrying out one or more embodiments of the present disclosure.

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention. It should be understood, however, that the detailed description and the specific examples, while indicating examples of embodiments of the invention, are given by way of illustration only and not by way of limitation. From this disclosure, various substitutions, modifications, additions rearrangements, or combinations thereof within the scope of the present invention may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the present invention. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill would appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

In addition, it is noted that the embodiments may be described in terms of a process that is depicted as a flowchart, a flow diagram, a structure diagram, or a block diagram.

Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings are included herein to aid in locating certain sections of the detailed description. These headings should not be considered to limit the scope of the concepts described under any specific heading. Furthermore, concepts described in any specific heading are generally applicable in other sections throughout the entire specification.

Embodiments discussed herein include methods and apparatuses that use projectional morphological analysis of N-dimensional signals. For the most part, the discussion herein focuses on signals comprising two-dimensional images. However, the processes can generally be applied to one-dimensional signals, such as those captured by sensors, or other such signals. Moreover, the processes can be generalized to apply to signals with any number of dimensions.

1. General Description of Projectional Morphological Analysis

Projectional morphological analysis searches for a projection of a given scene (e.g., an image) upon what is called a "shape" or a "form" that represents significant aspects of a given image and does not depend upon the image conditions such as illumination, contrast, angle of observation, etc. As a result, it becomes possible, for a given problem of image analysis (feature extraction, filtering, etc.) to develop a functional description, the minimization of which gives a solution of a problem in just one analysis process. In contrast, classical mathematical morphology generally requires multiple analysis processes and possibly interpretation of the intermediate results to determine what the next analysis process should be.

Of course, even with projectional morphological analysis, some minor preprocessing operations or post processing operations may also be required, but not the cascades of elementary morphological operations used in classical morphological analysis.

Furthermore, it becomes straightforward to generalize consideration from 1D- and 2D-cases (signals and images, respectively) to the case of color images or N-dimensional "images" as well. This last capability opens up a unique avenue to pursue solutions of such problems as quality assurance, analysis of defects in battery materials or in nuclear components using 3D-"images" (e.g., plots) of surface roughness on the (x, y) grid, and solving the problems of extracting features and classifying them accordingly. Regarding materials analysis, features are defined broadly as unique surface attributes related to material properties, such as a defect or defect propagation, impurity, material growth, material loss or abatement, or material dislocation. Likewise, a feature might be defined in terms of grain boundaries, interfacial regions, or particles or porous regions whose sizes or shapes change over time or other domain.

A noteworthy point in any problem of image segmentation, feature extraction, etc., is the formulation of its mathematical model. The human visual cortex and rapid processing power of the human mind are really hard to match—even with fast computers and sophisticated algorithms. On a purely qualitative level, human beings solve many problems of image analysis and recognition—almost every waking minute. This probably implies that the models used in such cases are largely representative of reality. Feature extraction is performed using the information contained in the analyzed image; and conclusions inferred from such analysis are compared to the existing knowledge about the studied objects/processes.

Using computers it is currently difficult to analyze a variety of images in a completely automatic mode. One reason is that for "real-time" automatic image processing, substantial supercomputer type resources are needed. Perhaps more importantly, in many cases, mathematical models of objects, phenomena, or the combination thereof that are being studied, are very complex and difficult to build, if at all possible.

On the other hand, a large class of models exists that can be solved by computers far better than by humans. Typically, these problems include simple models of image formation, which opens the possibility of analyzing information about object shapes that are contained in images.

From this point of view, one fundamental problem in the general field of image analysis is the construction of such mathematical models that capture the principal features and contents of an image. Such a description (i.e., mathematical model) should include only the most relevant, fundamental information about the image (i.e., the "signal") and ignore the less relevant information (subtle details, i.e., "noise"). In morphological analysis, we assume that a suitable image is available; we consider as substantially irrelevant the conditions of image acquisition, or its background, the parameters of registering instruments, or the conditions of illumination. Thus, one could conclude that the methods of morphological analysis are a step on the way towards understanding the description of image semantics.

Images of the same scene recorded at different conditions (e.g., weather, illumination, time of day, etc.) can differ radically. This fact renders far more difficult the tasks of analysis and feature extraction of "real" images that ideally should not depend on the conditions of their registration.

Among others, one could mention problems of identifying an unknown object on the background of a well-known scene, with uncontrolled illumination. The methods of morphological analysis developed for solving such problems have turned out to be very effective.

Consider the idea of such methods using the following example. Assume that a certain image was acquired using a camera in the visible light spectral range. Generally, such an image carries "sufficiently detailed" information about the geometrical shapes of the objects so that the objects can be detected and identified or classified. This statement is true because object surfaces that possess the same geometrical and optical properties generally have the same brightness. Assume that these properties are conserved even if the spectral range of illumination and its nature are changed. Images of a given scene, even though potentially acquired with different optical techniques and in different conditions, will be connected to the geometrical properties of the objects comprising the scene, and they can (in principle) be obtained (e.g., extracted) via image brightness transformation(s). In mathematics, it is said that the maximal invariant of such class of transformations will determine all of the objects that are inherently present at a given scene and do not depend upon the conditions of image formation. Such an invariant, in analogy to solid-state physics, could be called the "form factor," or "form (shape)." Inasmuch as this invariant does not define the scene completely, it is called the image form for a given scene. The differences between one scene image and the others that are not related to the conditions of image acquisition could be related to the differences in the image content, for example, the appearance of new objects on the scene, or disappearance of old objects. The brightness of infrared images that carries information on the physical properties of objects (e.g., thermal contrast) could be related to the geometric shape of the images and, thus, firmly connected to specific objects on this scene.

To continue, the mathematical language used in order to conduct multispectral morphological analysis of different complex objects is introduced. By the term "image," a function $f(\cdot):X \to R^1$ may be defined, given on a discrete set $X=\{x_1, \ldots, x_N\}$, called the "field of view." For convenience, consider that images are just vectors of the N-dimensional Euclidean space: $f_i=f(x_i)$, $x \in X$, $i=1, \ldots, N$.

In certain cases (which may be important from a practical point of view), a model of image transformation can be described as follows:

$$f=F(h,v), h \in V_g \subset R^N, f \in R^N, \quad (S1.1)$$

where $f$ is obtained for different conditions of its acquisition. F is the function characterizing additional possible distortions introduced in the course of image acquisition. In addition to that, image distortions can be stochastic and depend on a random noise, v. The set $V_g$ is referred to as the form of image g. The one that is minimal with respect to its inclusion into the linear vector space, $L_g \subset R^N$, containing that set $V_g$, will be referred to as, "form—in the broad, or general, sense." If $V_a \subset V_b$, then we will say that image a is not any more complex in its shape than image b and will denote this as $a \prec b$. If a $\prec$ b and a $\succ$ b, then we will say that two images are equivalent with respect to their forms, and will denote that fact as a~b.

Not surprisingly, the case that is most extensively studied is when the image $f$ is transformed according to the linear scheme given below:

$$f(x)=g(x)+v(x), x \in X, g(\cdot) \in V_g, \quad (S1.2)$$

In expression (S1.2) it is assumed that the shape $V_g$ is known, and the first moment $Ev(x)=0$, $x \in X$, the noise is uncorrelated:

$$Ev(x_1)v(x_2) = \begin{cases} \sigma^2, & x_1 = x_2 \\ 0, & x_1 \neq x_2 \end{cases},$$

$$x_1, x_2 \in X,$$

and the dispersion $\sigma^2$ is unknown. Image g in expression (S1.2), which defines the shape (form), $V_g$, is a linear combination of the following type:

$$g(x) = \sum_{i=1}^{n} c_i \chi_i(x), x \in X, \quad (S1.3)$$

In expression (S1.3), $c_i \in R^1$, $i=1, \ldots, n$, and $\chi_i(\cdot)$, $i=1, \ldots, n$, —are the characteristic functions of the sets $A_1, \ldots, A_n$, forming the field of view:

$$X: \chi_i(x) = \begin{cases} 0, & x \notin A_i \\ 1, & x \in A_i \end{cases},$$

$$\bigcup_{i=1}^{n} A_i = X, \text{ and}$$

$$V_g = \{h_F : h_F(x) = F(g(x)), x \in X, F(\cdot) \in F\},$$

In the expression above, function $F(\cdot)$ represents the influence of different conditions of the image formation; F is a set of functions such that $F(\cdot):R^1 \to R^1$, which describe the variety of conditions of image acquisition, image formation, or combination thereof.

Assume that $$h_F(x) = F(g(x)) = \sum_{i=1}^{n} F(c_i) \chi_i(x),$$

and orthogonal vectors are defined by $$(\chi_i, \chi_j) \equiv \sum_{x \in X} \chi_i(x) \chi_j(x) = 0,$$

if $i \neq j$, $i, j = 1, \ldots, n$.

Then the form of image g is just a linear combination of orthogonal vectors, $\chi_i$, $i=1, \ldots, n$, in Euclidean space $R^N$ of all images, i.e., it is an n-dimensional subspace of vector space $R^N$, as shown below:

$$V_g = \left\{ h(x) = \sum_{i=1}^{n} C_i \chi_i(x) \,\middle|\, C_i \in R^1, i = 1, \ldots, n \right\} \quad (S1.4)$$

Form $V_g$ is uniquely defined by the concatenation $$\bigcup_{i=1, \ldots, n} A_i = X.$$

It is useful if the brightness of each image, $h \in V_g$ on each of the sets $A_i$, $i=1, \ldots, n$, is substantially constant. In other words, a random image formed according to the model {(2), (3)}, obtained at different observation/acquisition conditions (each described by a function $t(\cdot) \in T$), will possess a constant first moment (mathematical average) on each of the sets $A_1, \ldots, A_n$, and the same dispersion (second moment).

Now consider the problem of approximating an image $f \in R^N$ by such images $$h \in V_g \qquad (S1.5)$$

that the solution of this problem, a vector function $\tilde{g}$, is an argument that delivers the global minimum to the energy-like quadratic functional:

$$\tilde{g} = \underset{h \in V_g}{\arg\min} \|f - h\|^2. \qquad (S1.6)$$

It is well known from theory that this problem can always be uniquely solved. The solution is an orthogonal projection:

$$\tilde{g} = \prod_{V_g} f = \sum_{i=1}^{n} \frac{(f, \chi_i)}{\|\chi_i\|^2} \chi_i \text{ of the image } f \text{ on } V_g, \qquad (S1.7)$$

By definition, $$(a, b) = \sum_{x \in X} a(x) b(x)$$

is the scalar product and $\|a\|^2 = (a,a)$ is the vector noun squared in the Euclidean space $R^N$.

Let the image $f$ be defined by the equality (S1.2), in which $g \in V_g$. Then the following mathematical statement will be true:

$$E\|f - \Pi_{V_g} f\|^2 = E\|g + v - \Pi_{V_g} g - \Pi_{V_g} v\|^2 = E\|(I - \Pi_{V_g}) v\|^2 \qquad (S1.8)$$

In equation (S1.8) $I: R^N \to R^N$ is the unity operator. The value $\|(I - \Pi_{V_g}) f\|^2$, which is equal to the distance squared between $f$ and $V_g$, is a measure of quality of the approximating solution. It also characterizes the difference between image $f$ and image $g$.

2. Hardware Environment

FIG. 1 is a simplified block diagram of a computing system 100 configured for carrying out one or more embodiments of the present disclosure. The computing system 100 is configured for executing software programs containing computing instructions and may include one or more processors 110, memory 120, operational storage 130, one or more communication elements 150, and a user interface 140.

The one or more processors 110 may be configured for executing a wide variety of operating systems and applications including the computing instructions for carrying out embodiments of the present invention.

The memory 120 may be used to hold computing instructions, data, and other information for performing a wide variety of tasks including performing embodiments of the present invention. By way of example, and not limitation, the memory 120 may include Synchronous Random Access Memory (SRAM), Dynamic RAM (DRAM), Read-Only Memory (ROM), Flash memory, phase change memory, and other suitable information storage devices.

The communication elements 150 may be configured for communicating with other devices or communication networks. By way of example, and not limitation, the communication elements 150 may include elements for communicating on wired and wireless communication media, such as, for example, serial ports, parallel ports, Ethernet connections, universal serial bus (USB) connections IEEE 1394 ("firewire") connections, BLUETOOTH® wireless connections, 802.1 a/b/g/n type wireless connections, cellular phone wireless connections and other suitable communication interfaces and protocols.

The operational storage 130 may be used for storing large amounts of non-volatile information for use in the computing system 100. The operational storage 130 may be configured as one or more storage devices. By way of example, and not limitation, these storage devices may include computer-readable media (CRM). This CRM may include, but is not limited to, magnetic, optical, and solid state storage devices such as disk drives, magnetic tapes, CDs (compact discs), DVDs (digital versatile discs or digital video discs), Flash memory, and other suitable information storage devices.

The user interface 140 may include input devices and output devices operably coupled to the processor 110. By way of non-limiting example, the input devices may include elements such as a keyboard, a numerical keypad, a mouse, a touch-screen, a button array, a track pad, a remote control, cameras, sensors, a microphone, and combinations thereof. The input devices may be configured to receive commands from the user and present the commands to the processor 110 to perform operations responsive to the commands.

By way of non-limiting example, the output devices may include one or more displays such as a light-emitting diode (LED) array, a segmented display, a liquid crystal display, a cathode ray tube display, a plasma display, and other types of electronic displays. The output devices may also include other peripheral output devices, such as speakers. In some embodiments, the input devices and the output devices may be integrated in the same device, such as, for example, a touch-screen display. In other embodiments, the input devices and the output device may be implemented in separate devices, such as a keyboard and an LCD monitor, respectively.

In some embodiments, the input devices may include sensors, cameras, or combinations thereof configured to capture the signals used in the projectional morphological analysis discussed herein.

Software processes illustrated herein are intended to illustrate representative processes that may be performed by one or more computing systems 100 in carrying out embodiments of the present invention. Unless specified otherwise, the order in which the processes are described is not to be construed as a limitation. Furthermore, the processes may be implemented in any suitable hardware, software, firmware, or combinations thereof. By way of example, software processes may be stored on one or more storage devices 130, transferred to a memory 120 for execution, and executed by one or more processors 110.

When executed as firmware or software, the instructions for performing the processes may be stored or transferred on a computer-readable medium. In addition, when executing firmware or software instructions, the computing system 100 should be considered a special purpose computing system and the processor 110 should be considered a special purpose processor configured for carrying out embodiments of the present disclosure.

3. Software Platform

Figure 2:
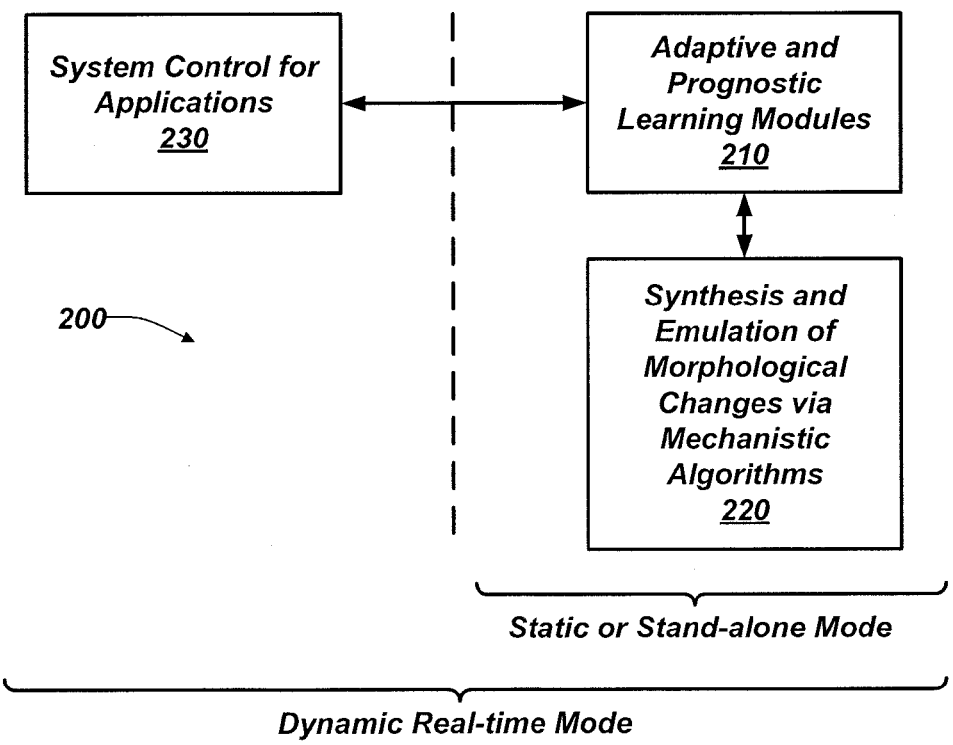
FIG. 2 is a simplified block diagram of general organization of software processes configured for carrying out one or more embodiments of the present disclosure.

FIG. 2 is a simplified block diagram of general organization of software processes 200 configured for carrying out one or more embodiments of the present disclosure. As a non-limiting example, these software processes 200 may be executed on a computing system 100, such as that illustrated in FIG. 1.

A change identification process 220 (also referred to herein as a change identification software module) includes software modules for identifying morphological changes, emulation of morphological changes, or combinations thereof using physics-based algorithms to match or diagnose mechanisms of observed morphological behavior between an N-dimensional input signal and additional N-dimensional input signals to determine additional N-dimensional forms that may be used in the projectional morphological analysis.

A learning process 210 (also referred to herein as a learning software module) includes an adaptive learning capability, a prognostic learning capability, or a combination thereof that uses the change identification process 220 to predict future trends of surface morphology.

The change identification process 220 and the learning process 210 may be configured as a static library of computing algorithms identified for analysis of existing data comprising N-dimensional input signals. In other words, the processing libraries are predefined and static in the sense that they do not change when being applied to a set of N-dimensional input signals.

The change identification process 220 and the learning process 210 also may be configured as a dynamic library where some of the computing algorithms adapt to changes between different inputs signals in a set of N-dimensional input signals. Thus, if the set of N-dimensional input signals are images captured over a time sequence, the computing algorithms may be configured to adapt to changes identified over the time sequence.

A system control module 230 may be used to control identification of these changes and the adaptation of the algorithms themselves, or an adaptation to different algorithms. In some embodiments, the system control module 230 may be defined in terms of an intended application for which the morphological analysis is applied as a quality control check, such as a manufacturing process.

As a result, in sigmoidal-based approaches (as well as other time-varying approaches) discussed below with reference to FIGS. 10, 11A, and 11B, projection morphological analysis supports synthesis/emulation of morphological changes (SEMC) through physics-based mechanistic algorithms, as represented in element 220 in FIG. 2. This capability is used to match or diagnose mechanisms with observed morphological behavior, typically over time. Adaptive and prognostic learning (element 210 in FIG. 2) can draw from SEMC to predict future trends of surface morphology attributes. Once sigmoidal mathematical rate expressions (or other types) are known from SEMC, they can be used to project future trends in the chosen surface/image features.

In addition, statistical analysis may be used to increase a confidence level in the projectional morphological analysis of results from a plurality of N-dimensional signals used as the N-dimensional input signals. With a large sample of N-dimensional signals, differences in analysis between any given images can be analyzed to give statistical parameters such as, for example, means, standard deviations, and confidence levels for a variety of parameters and forms identified for the projectional morphological analysis.

The developed platform represents the main executable module and the modules that can be appended that contain the algorithm descriptions and coding. As a non-limiting example, in the case of the WINDOWS® 7 operating system, the module to be appended is of the .dll type.

The .dll-modules containing the description of the algorithms, can be developed independently for any particular image processing problem. For convenience, a code-generator has been developed, which uses the META-description of the algorithm (the number of principal and/or auxiliary parameters and their types) to generate a special template-file using the C++ algorithmic language.

This code-generator changes as the internal interfaces of the platform undergo change. In turn, this implies that a developer of the plug-in modules does not have to trace the changes in the internal architecture of the platform, concentrating upon the algorithm development instead.

"Feeding" this META-information to the code generator and adding the algorithm implementation into the corresponding module, results in a working module if the working model is compiled into a .dll module and placed into a module subdirectory (e.g., /plugins) of the directory containing the main executable module of the platform. As a result, algorithms will become available and can be invoked by the software platform.

Algorithms can be organized into sub-catalogues in the module subdirectory, which allows for storing and grouping of the different project types (e.g., with different algorithms).

The original code for the software platform may be organized into separate cells. Each cell may include a number of interfaces such as, for example:
  a) Add cell to the Platform
  b) Remove cell from the Platform
  c) Test cell This approach allows for changing any part of the software at any time, up to and including basic structures, classes of data, thereby reducing significantly the risk of new mistakes (e.g., bugs) being introduced into the software platform. The code generator may be used both for the generation of the plug-in modules and for the generation of the elements of the software platform itself.

Algorithms from the plug-ins are executed in the data stream, which may be separated from the main program data stream. In some embodiments, an indicator of the algorithm execution progress may be presented on a main interface of a Graphical User Interface (GUI).

In some embodiments, an interface for new module development may represent a subset of the MATLAB module generator, with several extensions. For this reason, any algorithm developed for the software platform may be "compilable" using the MATLAB platform.

Data input for processing in the software platform also may be realized using plug-in modules.

As a non-limiting example, the user interface may include:
  a) A main window for the program text input representing a string of commands for calling the algorithms for work with data;
  b) A number of auxiliary detachable windows to display real-time data, which may include auxiliary windows for: Mex library (explained below), variable lists, image lists, image viewers, and Message logs;
  c) Instrument panels; and
  d) Menus with commands to control execution of the main module.

Since algorithms may be executed in a separate data stream, the main user's interface should not "freeze" in the course of the program execution. In addition, progress of the program execution and each of its algorithms can be displayed using an indicator of completion for each command line.

In some embodiments, intermediate results may be available for viewing in auxiliary detachable windows (e.g., variable lists, image lists, a viewer of two-dimensional data arrays as images). In these embodiments, a user may activate these auxiliary detachable windows by a suitable means, such as, for example, double clicking on a name in the image list window, which would bring up an image viewer window to present the two-dimensional data of the selected name.

In some embodiments, two-dimensional arrays may be represented as grayscale images. A set of 2D-arrays may represent a color image, such as, for example, in different color spaces such as RGB, CMYK, and YUV color representations.

The user can control execution of the main program—to launch; stop; continue execution from the current cursor position. In the case of abnormal execution (and also after normal program execution) the program may dump up to 1,000 lines containing information about the preceding function calls and their parameters (e.g., a file log.1st). A similar "dump" related to the execution of algorithm(s) from the plug-in module(s) can be located in a file thread.1st. These files may be sent to developers of the morphological analysis software via e-mail for any possible correction and bug elimination.

A list of all available algorithms is located in the window "Mex Library." A tree structure of the algorithms is also available for review with their brief description. If the user double-clicks a line from this list, then (a) if this is a folder, it will open up; and (b) if this is an algorithm—the template for its call will be inserted into the program code.

3.1. Platform Tasks Specifications and Applications

Capabilities of embodiments of the morphological analysis software platform are demonstrated using several original morphological projectional algorithms. The platform is quite versatile and allows for the successful solving of very different tasks.

The developed algorithms of morphological processing are simple, but powerful, and are easy to parallelize for use on supercomputers. Estimates give processing speed(s) consistently faster than FFT analysis. In addition, the more a-priori information obtained about the system, the faster it will work. Among possible applications are the following areas: (1) recognition of incoming threats in battlefield in real time. Typically, there may be less than 4 seconds to analyze the threat, classify it, and apply countermeasures. This analysis is complicated by the vapor-like plume surrounding incoming projectile; (2) artificial vision algorithms and cars without drivers. We could design very effective algorithms that can be designed to distinguish between a "flat surface" (e.g., a road) and curbs at the perimeter of the road. Compared to existing systems, morphological analysis could be remarkably fast; (3) Observations from space; (4) Ability of algorithms to autonomously distinguish between "real" objects and their shadows; (5) Sigmoidal-based rate expressions for analysis of parameters such as defects, defect propagation, impurity, material growth, material loss or abatement, and material dislocation.

In addition, morphological filters could be realized in hardware (i.e., hardware optimized to solve a specific recognition problem) and installed on future combat systems for rapid identification of incoming threats, and many others. Of course, these non-limiting examples are given to show the diversity of problems that can be addressed by embodiments of the present disclosure. Many more applications are contemplated within the scope of the present disclosure.

3.1.1. Morphological Filtering of 3-D Surfaces

Morphological Filtering may be used on 3-D Surfaces in order to extract features relevant to material processing operations. Such operations include development of a new approach to invariant pattern recognition and feature extraction—filtering with simple geometrical figures.

A final goal would be to develop a principally new mathematical approach to pattern recognition (in 2-D-, 3-D- and multidimensional spaces), based on filtering with simple geometrical figures. The mainstream approach to this enormous problem is mostly "algebraic," i.e., application of linear integral transforms (e.g., Fourier transform, FFT, Hartley, Laplace, wavelets, etc.).

Embodiments of the present disclosure are based on "geometry" (morphological analysis) and filtering with simple geometrical figures.

Figure 3A:
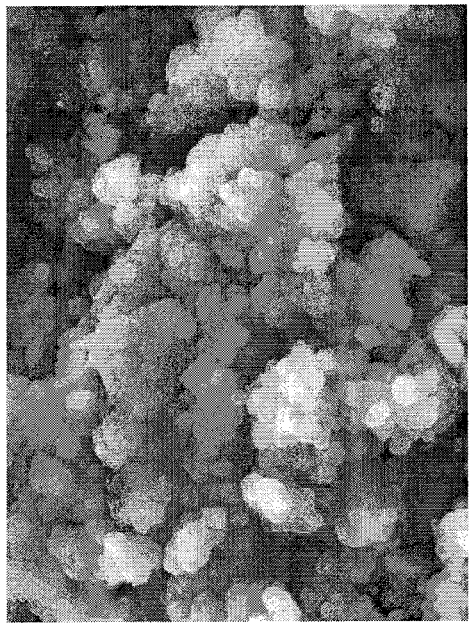
FIGS. 3A-3D show morphological processing of a battery electrode material, before and after one charge/discharge cycle.
Figure 3B:
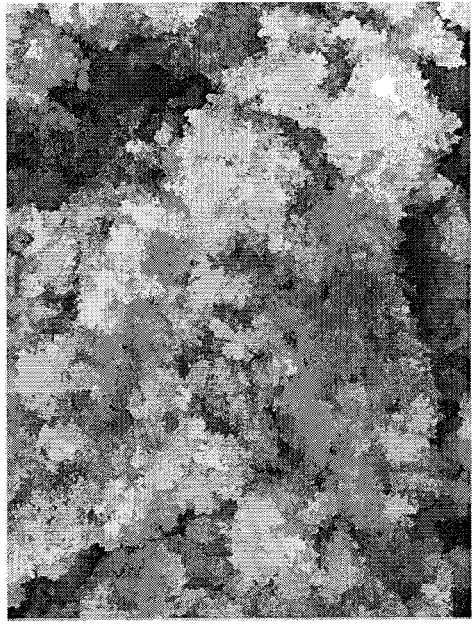
Figure 3C:
Figure 3D:

FIGS. 3A-3D show morphological processing of a battery electrode material, before and after one charge/discharge cycle. Thus, these figures illustrate the evolution and damage of the surface of the battery electrode material that accompanies the battery cycling. FIGS. 3A and 3B provide comparison of the original electrode (FIG. 3A) and the same electrode (FIG. 3B) after one cycle of charge/discharge. FIGS. 3C and 3D are similar to FIGS. 3A and 3B, respectively, except FIG. 3D is the result of about 250 iterative morphological transformations of brightness (explained more fully below) of FIG. 3C, rather than an actual image of the surface of the electrode material. One can see from the similarity of FIGS. 3B and 3D that the evolution of morphology is identified by the iterative morphological transformation process.

Figure 4A:
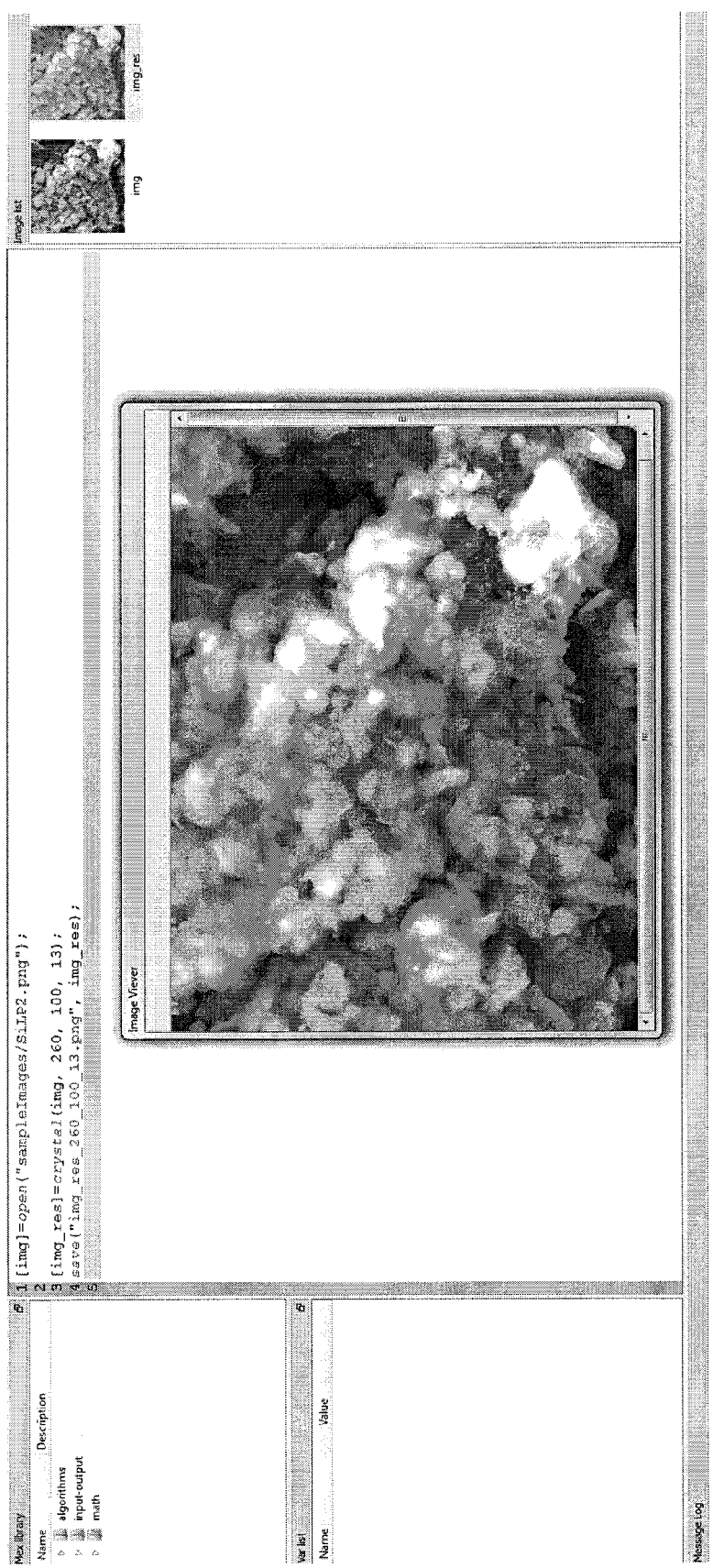
FIG. 4A shows a GUI for processing an image of a battery electrode material.
Figure 4C:
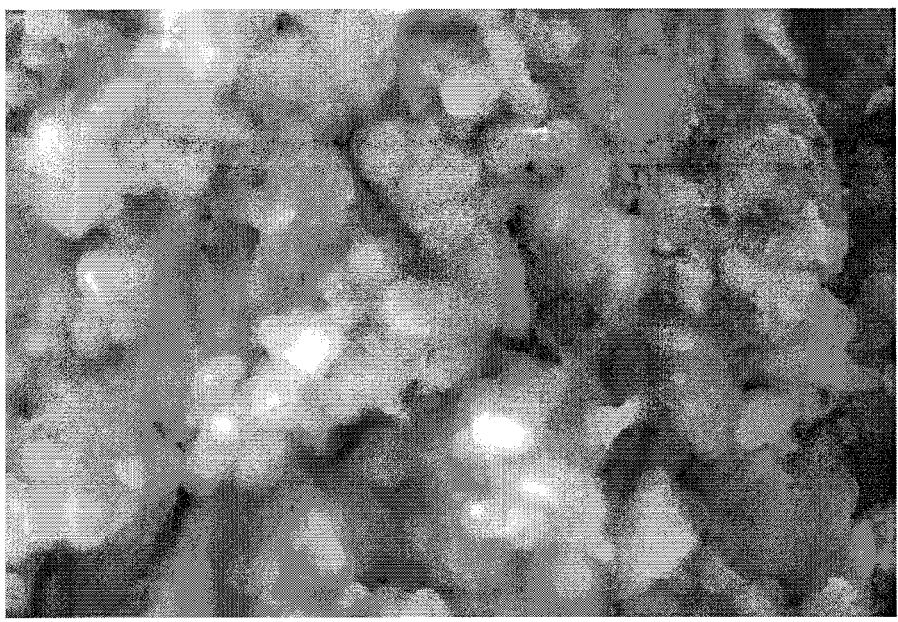
FIGS. 4B and 4C show an image of the battery electrode material of FIG. 4A and results of morphological processing of the image, respectively.
Figure 4B:
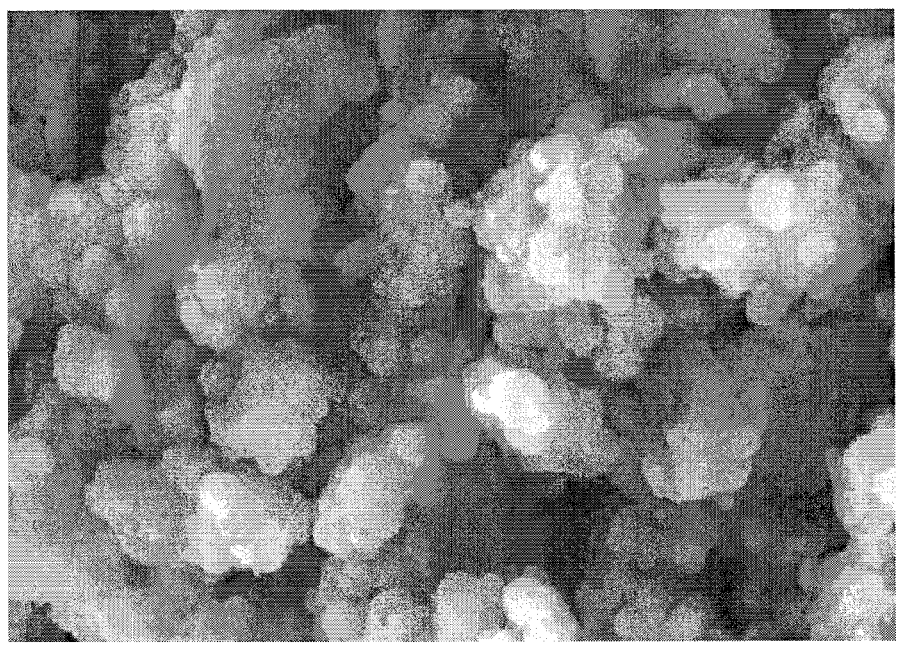

FIG. 4A shows a GUI for morphological processing of the same material shown in FIGS. 3A-3D according to embodiments of the present disclosure. FIGS. 4B and 4C show a comparison of the obtained result to experimental data where FIG. 4B illustrates an image of the experimental data and FIG. 4C illustrates the result of an iterative morphological transformation with a different morphological algorithm relative to the result shown in FIG. 3D.

3.1.2. Extracting Information about Well-known Objects

Embodiments of the present disclosure may be used to extract information about well-known object(s) against the backdrop of unknown scenery and changing conditions of observation (e.g., registration).

A module for performing such an operation may be referred to as "search," which searches for a known object located in an unknown background.

The search module may be a function call such as:

[x y]=search(image, etalon, threshold=5e-3, ndims=10).

In such a function, "image" is an image in which the object is searched for, "etalon (i.e., standard) is the object to be searched for, "threshold" is an optional parameter defining a threshold for the morphological function, and "ndims" is an optional parameter for the intended number of dimensions of the shape. The search algorithm returns "x" and "y" as an array of positions where the object appears to be found.

3.1.3. Detecting an Unknown Object Against a Well-known Background when Registration Conditions Might Vary Embodiments of the present disclosure may be used to detect information about an unknown object against a well-known background, but where registration conditions of the background might vary.

A module for performing such an operation may be referred to as "differences," which searches for a new object on a known background.

The differences module may be a function call such as:

area=differences (image, x0, y0, ethalon, ndims=50);

In such a function, "image" is an image containing the fragment where the new objects are, "x0, y0" is an offset of the image fragment (e.g., from the left upper corner), "ethalon" (i.e., standard) is the known background, and "ndims" is an optional parameter for the intended number of dimensions of the shape. The differences algorithm returns "area," which is an image of the same size as "ethalon" where pixels belonging to the new objects equal 1 and the other pixels equal 0.

Figure 5A:
FIGS. 5A-5C are images used in a "differences" algorithm of morphological analysis.
Figure 5B:
Figure 5C:
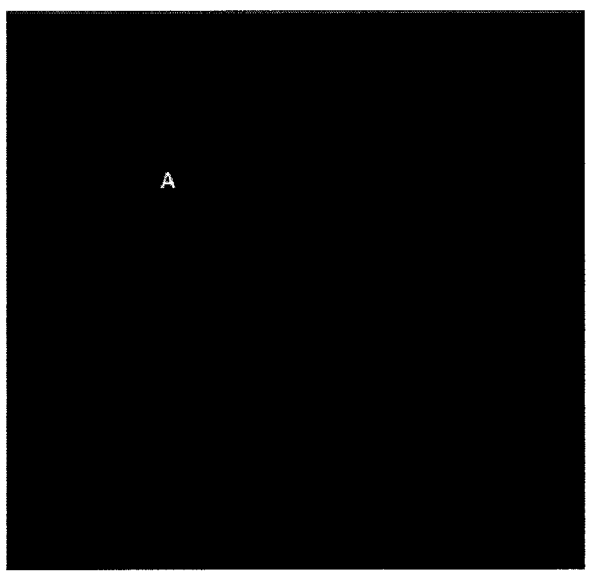

FIGS. 5A-5C are images used in a differences algorithm of morphological analysis. FIG. 5A illustrates a photograph of the M.V. Lomonosov Moscow University. FIG. 5B is an image of the same building, but under different illumination conditions, and including a principally new object (letter "A"). FIG. 5C shows an image of the result of the differences algorithm and what is fundamentally different between these two images, while not identifying the differences due to illumination.

3.1.4. Morphological Reconstruction of an In-focus Image of an Object

Embodiments of the present disclosure may be used to reconstruct a surface from a set of images captured with different focus distances (i.e., through focus). A module for performing such an operation may be referred to as "surfaceReconstruction."

The surfaceReconstruction module may include arguments such as, "image" as a cell array containing the images (i.e., slices) of the same surface captured with different focuses, "x0, y0" as an offset (e.g., from the left upper corner) of the image fragment for which the surface is to be reconstructed, "width" as a width of the image fragment, "height" as a height of the image fragment, and "nbsize" as an optional parameter defining a neighborhood size. The neighborhood of such a size is used to calculate the brightness deviation. The surfaceReconstruction algorithm returns "depth" as an array of size (height−nbsize+1)*(width−nbsize+1). Each element of the array contains the number of the slice in focus.

3.1.5. Detecting Edges of Color Areas Using a Color Image

Embodiments of the present disclosure may be used to detect edges of image areas with different colors. A module for performing such an operation may be referred to as "detectColorEdges."

The detectColorEdges module may be a function call such as:

area=detectColorEdges(image, x0, y0, width, height, nbsize=5);

In such a function, "image" is an image containing the fragment where the edges are detected, "x0, y0" is an offset of the image fragment (e.g., from the left upper corner), "width" is a width of the image fragment, "height" is a height of the image fragment, and "nbsize" is an optional parameter defining neighborhood size. The neighborhood of such a size is used to detect the edge in each point of the fragment. The detectColorEdges algorithm returns "area" as an image of size height*width. The pixels belonging to the edges equal 1, while the other pixels equal 0.

Figure 6A:
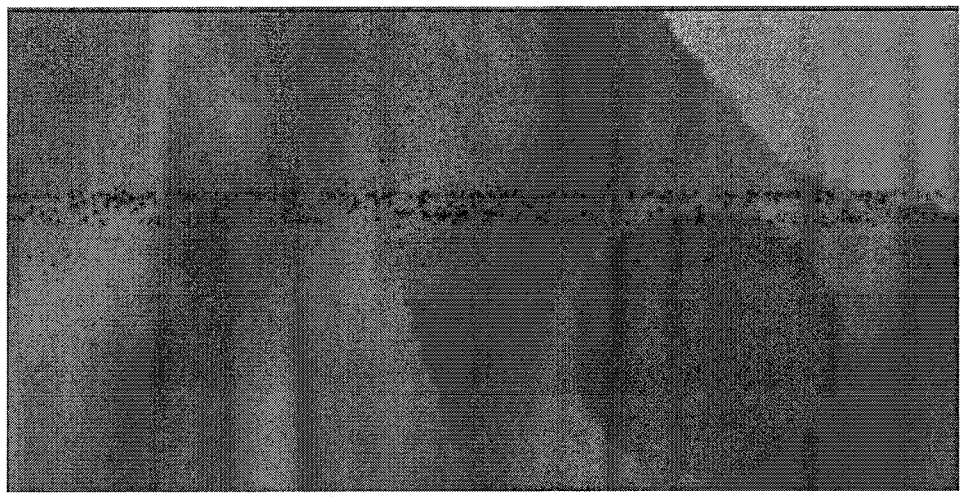
FIGS. 6A and 6B are images used in a "detectColorEdges" algorithm of morphological analysis.
Figure 6B:

FIGS. 6A and 6B are images used in the detectColorEdges algorithm of morphological analysis. FIG. 6A illustrates an image showing a grey portion on the left side of the image, an orange portion on the center right side of the image, a purple portion in the upper right corner of the image, and a green circle in the orange portion. FIG. 6B shows an image of the result of the detectColorEdges algorithm showing boundaries between colors as white and all other areas as black.

3.1.6. Identifying Boundaries of Nano-crystalline Silicon Particles in an Amorphous Silicon Matrix Embodiments of the present disclosure may be used to identify position and radius for cells within an image. Such an algorithm may include arguments such as, "image" as an image depicting different cells, "RFrom, RTo" as cell Radii, "eps" as an optional threshold for the morphological function. The algorithm may return, "res" as a resulting image with highlighted detected cells, "kfield" as a morphological rule results, and; "rfield" as radii of cells determined using the morphological algorithm.

Figure 7A:
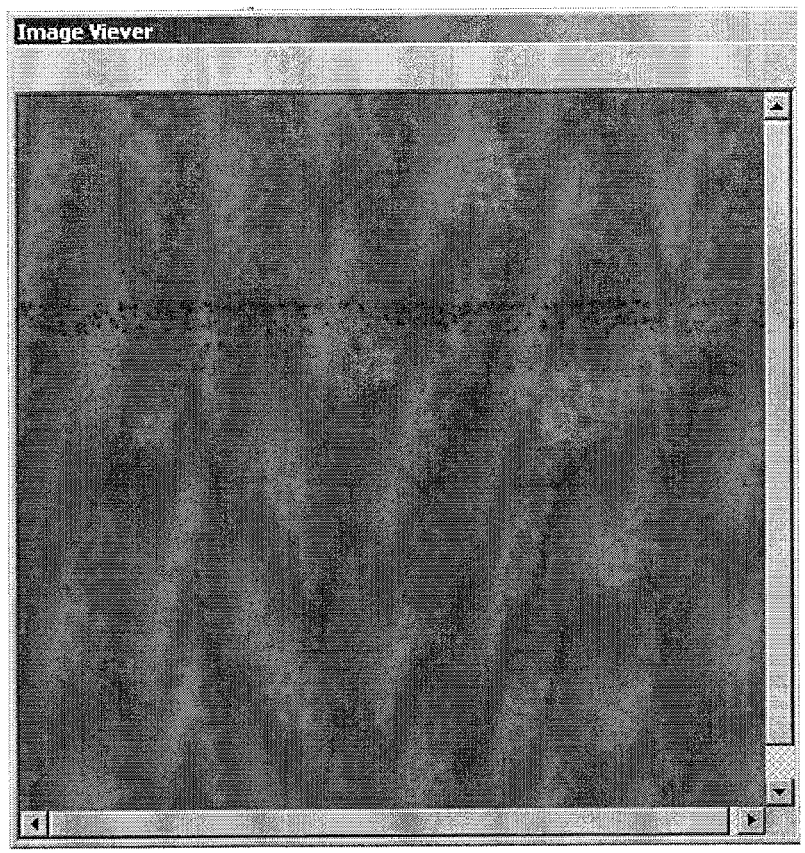
FIGS. 7A and 7B are images used in the of morphological analysis algorithm to detect cells within an image.
Figure 7B:
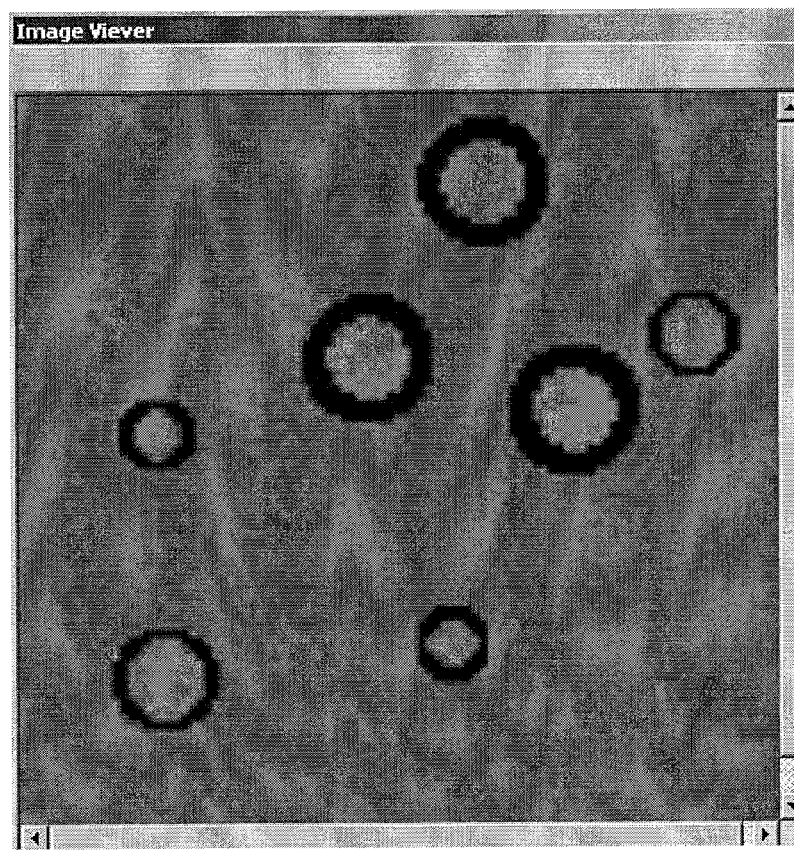

FIGS. 7A and 7B are images used in the of morphological analysis algorithm to detect cells within an image. FIG. 7A is the input image of particles in nano-crystalline silicon showing cells as a slightly lighter shading relative to the background. FIG. 7B shows an image of the result of the algorithm showing the perimeter of the detected cells as black circles around the outside of the cells.

3.1.7. Detecting Defects in Silicon Carbide Braiding Upon Zircaloy-4 Rod Surface Embodiments of the present disclosure may combine a number of algorithms to arrive at an analysis result. In this example, four different algorithms are used to detect defects in a Zircaloy-4 rod surface from an image of the rod. Four algorithms are defined as, "latticeCylinder," "latticeEtalon," "latticeFilter," and "latticeCenters."

The latticeCylinder module may include arguments such as, "img" as the original image, and "Image_from, Image_to" impose limitations on the width of the area subjected to morphological processing. The latticeCylinder algorithm returns "img_proj" as an image equalizing a "cylinder of brightness" and "img_diff" as an image with equalized brightness.

The latticeEtalon module may include arguments such as, "img" as an input image, "width" as a width of the etalon image to be returned, "height" as a height of the etalon image, and "width_offset, height_offset" as coordinates of the upper left corner of the input image. The latticeEtalon algorithm returns, "image" as an image of the etalon.

The latticeFilter module may include arguments such as, "img" as an input image, "eta" as an etalon image, and "dW, dW_center" for defining a supporting set for the filter with its height equal to that of img and its width equal to dW centered at dW_center. The latticeFilter algorithm returns "diff" as an image that represents brightness of the points of the computed image illustrating how well the points in the selected area correspond to those of etalon (i.e., "approach" the etalon).

The latticeCenters module may include arguments such as, "img_diff" representing the image with equalized brightness in each point, "etal" as an image of the etalon with equalized brightness of all points, "dW, dW_center" for defining a supporting set for the filter with its height equal to that of img_diff and its width equal to dW centered at dW_center, "diff" as an image representing brightness of the points of the computed image illustrating how well the points in the selected area correspond to those of etalon (i.e., "approach" the etalon), "level" as a threshold value that can vary from 0.0 to 1.0, which controls the extent to which one wants to extract defects (the larger its value, the finer defects will be extracted), and "img" as the original image; differences between this image and the etalon will be highlighted with color (e.g., green and red). The latticeCenters module returns, "res_alone" as an image of differences computed as difference between the image img_diff and the etalon for the points of maximum likelihood of the etalon and the studied image and "res_color" as the same image as "res_alone" except the differences are highlighted with color for proper visualization.

For general function, the module latticeCylinder is used for brightness equalization for the whole sample that is likely to be non-uniform originally.

The module latticeEtalon allows selecting the most perfect reference area of the sample (i.e., the "etalon").

The module latticeFilter applies the customized morphological filter in each point (pixel) of the analyzed image. It returns a parameter, "residual vector" in $L_2$ vector space for every point.

The module latticeCenters applies the morphological algorithm in every point of the selected area and returns the value of residual vector in each point (for the area surrounding it).

Figure 8:
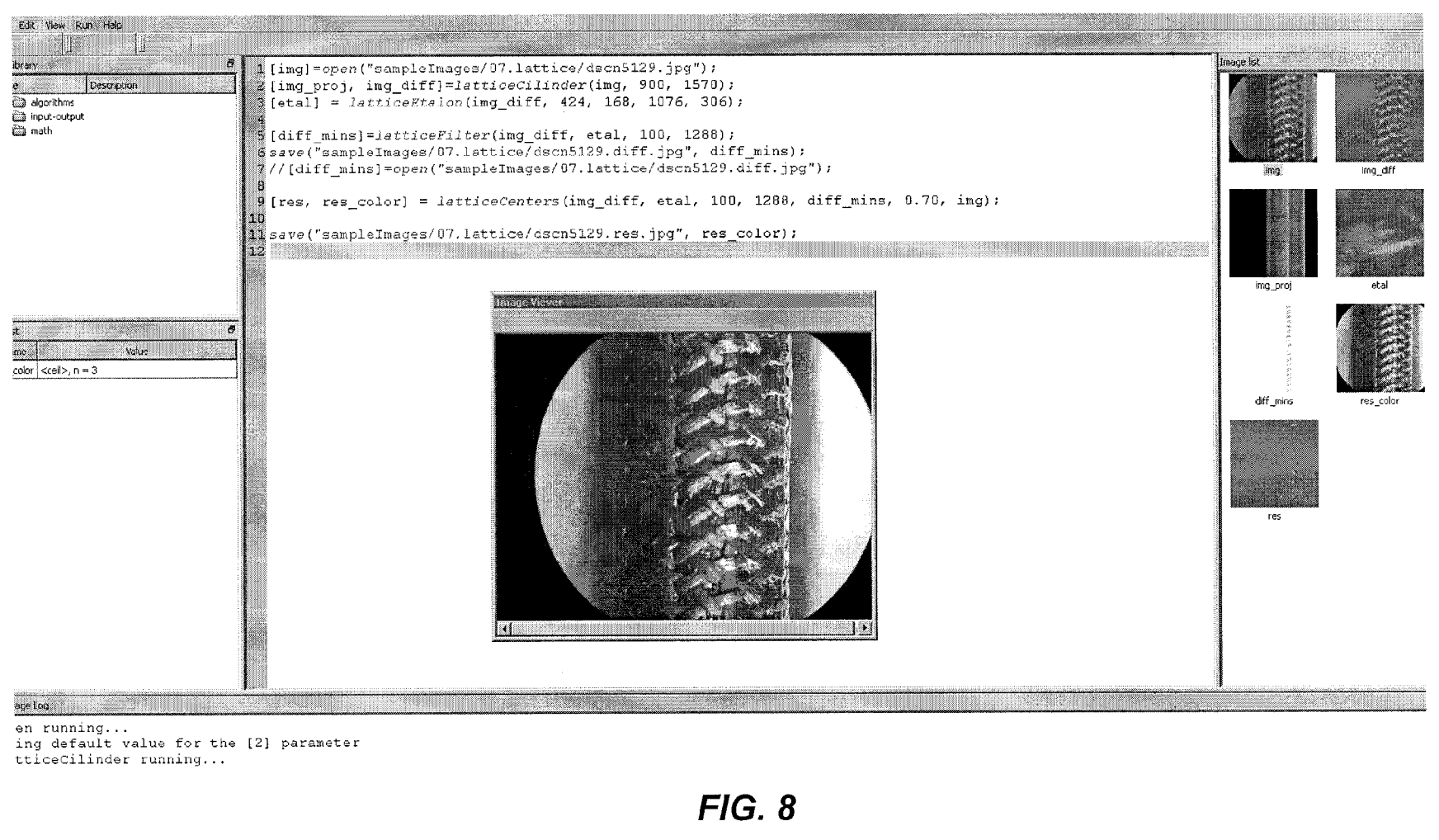

FIG. 8 illustrates a GUI showing an original image of a Zircaloy-4 rod surface and projectional morphological analysis code for analyzing the image.

Figure 9:
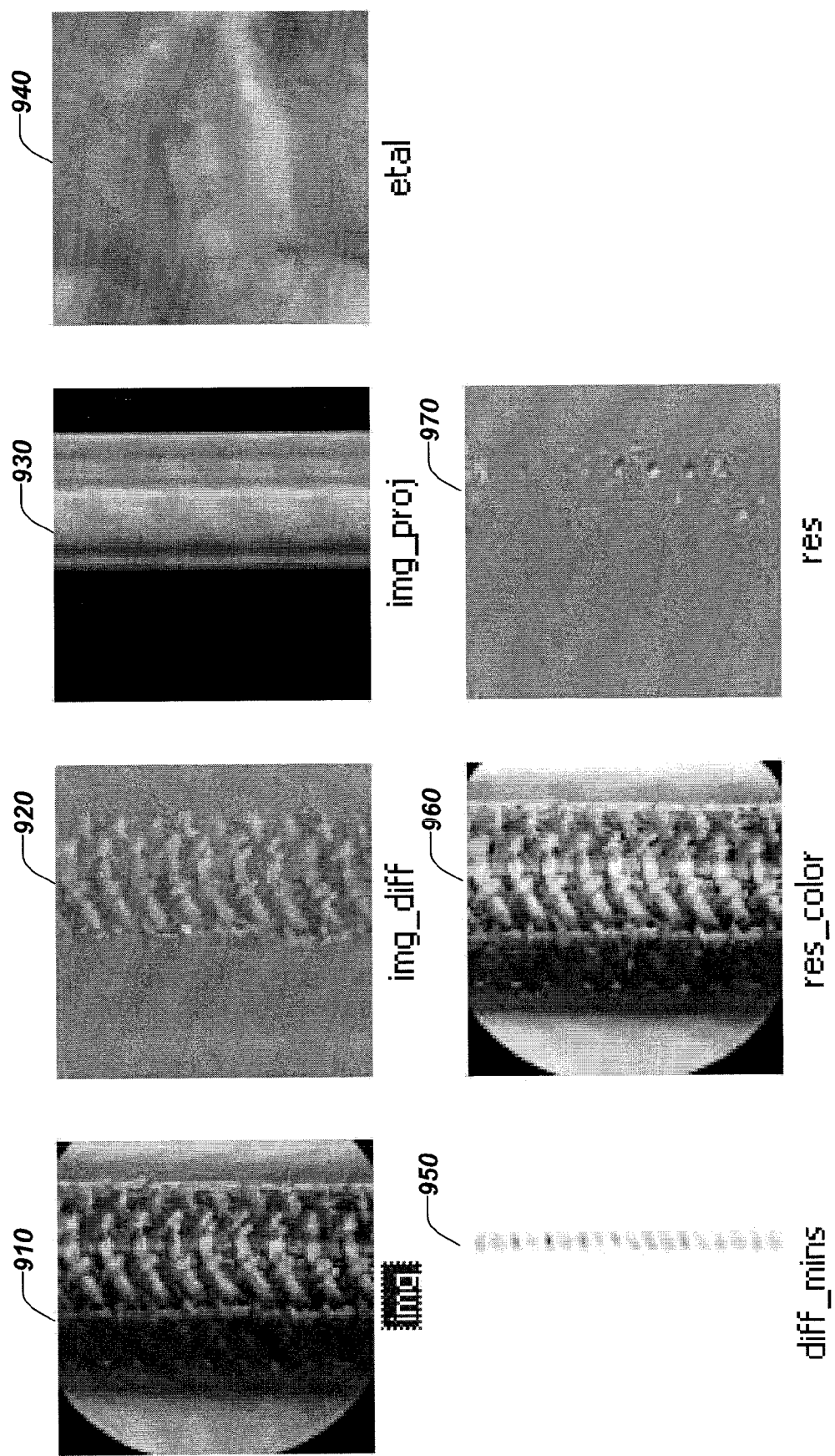
FIG. 9 illustrates a beginning image, various intermediary images, and resulting images during performance of the algorithm shown in FIG. 8.

FIG. 9 illustrates a beginning image, various intermediary images, and resulting images during performance of the algorithm shown in FIG. 8. Referring to FIGS. 8 and 9, the algorithm begins with the original image "img" 910 processed by the latticeCylinder algorithm to create image "img_diff" 920 and image "img_proj" 930. The latticeEtalon algorithm processes the image "img_diff" 920 to create image "etal" 940. The latticeFilter algorithm processes the image "img_diff" 920 and the image "etal" 940 to create the image "diff_mins" 950. Finally, the latticeCenters algorithm processes the image "image_diff" 920 and the image "etal" 940 to create the image "res" 970 and the image "res_color" 960.

3.1.8. Optical Morphological Prognostics and Diagnostics

It is feasible to adapt sigmoidal-based rate expressions to describe the change in surface morphological properties over one or more domains, particularly time. This allows us to extend the previous development herein to prognostic and diagnostic analysis of morphologic processes. The generalized form of a single sigmoid expression covering an arbitrary morphological attribute $\Psi_{j,i^*}$ affected by mechanism or process j under arbitrary system conditions i* is given as:

$$\Psi_{j,i^*} = M_{j,o} + 2(M_j - M_{j,o})\left[\frac{1}{2} - \frac{1}{1 + \exp((a'_j t)^{b_j})}\right]_{i^*} \quad [\text{G-1}]$$

where response $\Psi_{j,i^*}$ is a surface attribute related to a defect or defect propagation, impurity, material growth, material loss or abatement, or material dislocation. This attribute can also be defined in terms of a particle, interface, or porous region whose size or shape changes over time. Here, the expression is in terms of time t as the independent variable, yet we could also write similar expressions for other independent domains, such as temperature, or fields of an electrostatic, magnetic, or gravitational nature. Mechanism or process j covers those surface phenomena manifest from chemical reactions, physical/mechanical changes, thermodynamic phase behavior, etc. The variables in this expression are defined as:

- $a'_j$=equivalent intrinsic "rate constant" for mechanism or process j that affects $\Psi_{j,i^*}$
- $b_j$=equivalent intrinsic kinetic order of process j
- $M_j$=Theoretical maximum extent of progression of process j under i*
- $M_{j,o}$=Extent of progression of process j at time zero or other time reference.

As written, $\Psi_{j,i^*}$ is bounded between $M_{j,o}$ and $M_j$. It should be noted that the (a,b,M) parameters are unique to the chosen system condition i*. A change in i* (e.g., over time) necessitates re-evaluation of these parameters.

Surface properties can be affected by more than a single process. Hence we can extend the expression above to encompass a multitude of n simultaneous processes:

$$\Psi_{i^*} = \sum_j^n \Psi_{j,i^*} = \sum_j^n \left[M_{j,o} + 2(M_j - M_{j,o})\left[\frac{1}{2} - \frac{1}{1 + \exp((a'_j t)^{b_j})}\right]\right]_{i^*} \quad [\text{G-2}]$$

which assumes the processes are reasonably independent (alternative expressions can be derived for processes that are interdependent). The time derivative or rate of change in $\Psi_{i^*}$ is given as follows:

$$\frac{d\Psi_{i^*}}{dt} = r_{i^*}^{MSM} = \frac{d}{dt}(MSM)_{i^*} = \sum_j \left[\frac{2M_j a'^{b_j}_j b_j t^{b_j - 1} \exp((a'_j t)^{b_j})}{(1 + \exp((a'_j t)^{b_j}))^2}\right]_{i^*} \quad [\text{G-3}]$$

For application to morphological analysis it is necessary to assign Cartesian functionality to these rate expressions, since a given surface process j might undergo different directional progression in the (x, y, z) space. This is especially true if an obstruction is present nearby a surface attribute in the form of a hard boundary (wall) or the presence of another near-neighbor surface attribute. Also, preferred directional growth might stem from growth along a grain boundary, crystalline plane (epitaxial growth), or other interfaces. With this understood, we can write the above in terms of (x, y, z):

$$\Psi_{i^*,x} = \sum_j^n \Psi_{j,i^*,x} = \sum_j^n \left[M_{j,x,o} + 2(M_{j,x} - M_{j,x,o})\left[\frac{1}{2} - \frac{1}{1 + \exp((a'_{j,x} t)^{b_{j,x}})}\right]\right]_{i^*} \quad [\text{G-4}]$$

and likewise for y and z directions. Note that $M_j$ could be defined in terms of geometric distance outward from the locus of a given surface attribute in either x, y, or z directions. $M_j$, per its definition, can then be initially larger than the distance to an arbitrary nearby obstruction, $M_{obs}$, yet $\Psi_{j,i^*}$ cannot exceed $M_{obs}$. Such an obstruction may truncate the progression of growth in one or more directions in the local region of interest. Thus, obstructive barriers in the 3D space local to the surface attribute of interest should be assessed in the chosen domain, such as over each time step, so that the progression of each response $\Psi_{j,i^*}$ is kept within physical bounds.

Figure 10:
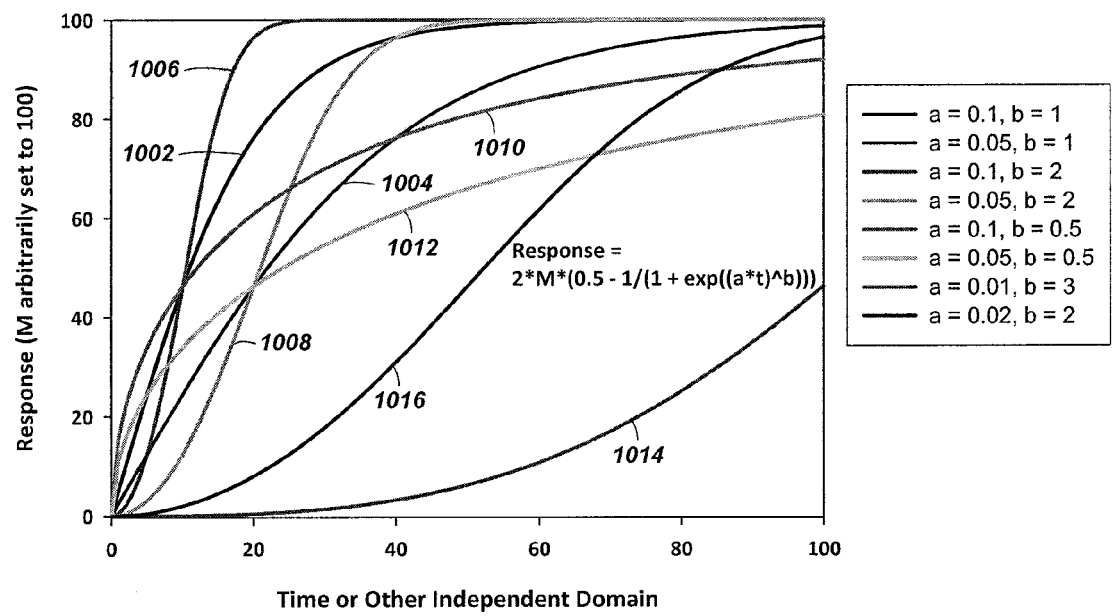
FIG. 10 shows profiles of several single-sigmoid functions having different values.

FIG. 10 shows profiles of several single-sigmoid functions having different values of (a, b). Here, $M_j$ has been set to 100 and $M_{j,o}$ set to zero for the sake of demonstration. A wide variety of behaviors is seen based on just the single-mechanism form of the sigmoid rate expression. Greater complexity would be captured using the multiple-sigmoid expressions above, thereby broadening the diagnostic and prognostic accuracy of this approach.

In FIG. 10, the profiles are based on the equation:

Response=$2*M*(0.5-1/(1+\exp((a*t)^b)))$.

Line 1002 illustrates a response when the variable (a, b) is set to (0.1, 1). Line 1004 illustrates a response when the variable (a, b) is set to (0.05, 1). Line 1006 illustrates a response when the variable (a, b) is set to (0.1, 2). Line 1008 illustrates a response when the variable (a, b) is set to (0.05, 2). Line 1010 illustrates a response when the variable (a, b) is set to (0.1, 0.5). Line 1012 illustrates a response when the variable (a, b) is set to (0.05, 0.5). Line 1014 illustrates a response when the variable (a, b) is set to (0.01, 3). Finally, line 1016 illustrates a response when the variable (a, b) is set to (0.02, 2).

In practice, the resultant rate analyses given above in Cartesian coordinates can be converted into one of several other coordinate systems to accommodate the geometry most applicable to the system, allowing a more faithful reconstruction and rendering of the change in surface attributes. A convenient construct is the ellipsoidal coordinate system, used here for demonstration purposes. The simplest case here would be a single process j undergoing equal growth in (x, y, z), implying (a,b,M) are equal in all (x, y, z). Under an ellipsoidal interpretation, this case produces a perfect hemisphere that grows over time (assuming no material abatement and no growth in the –z direction). In reality, the change in morphologic attributes is not strictly isotropic.

Figure 11A:
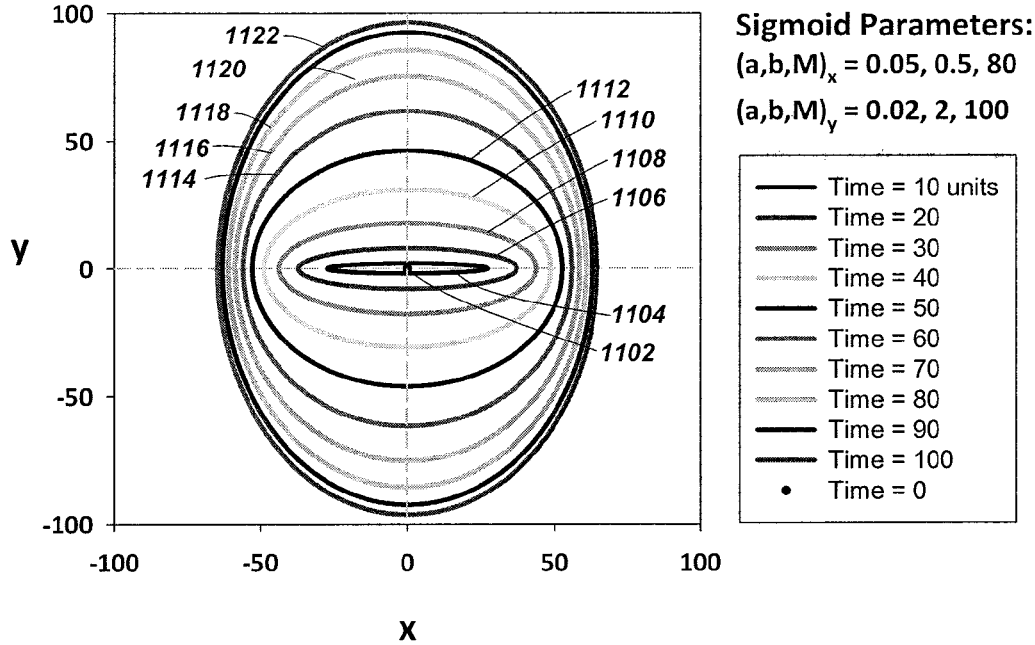
FIGS. 11A and 11B are results for a change in a generic surface attribute over time, using selected sigmoid expressions.
Figure 11B:
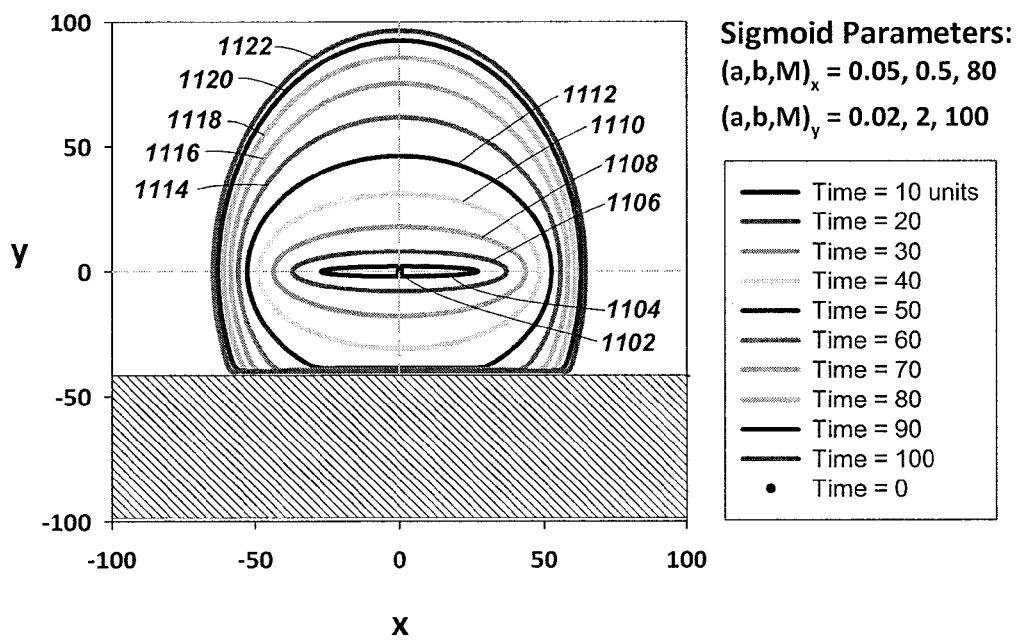

FIGS. 11A and 11B are results for the change in a generic surface attribute in (x, y) over time, using selected sigmoid expressions $\Psi_{j*,x}$ and $\Psi_{j*,y}$ similar to those in FIG. 10. The (x, y) plane is shown for clarity; (x, z) or (y, z) planes would be similarly assessed. It is seen that the growth trend early in the process involves rapid growth in x, yet slower growth in the y direction. This trend reverses later in time. Growth in the z direction will ultimately determine the effective topology created by this particular surface attribute.

In FIGS. 11A and 11B, central dot 1102 illustrates a growth projection at time=0 units. Line 1104 illustrates a growth projection at time=10 units. Line 1106 illustrates a growth projection at time=20 units. Line 1108 illustrates a growth projection at time=30 units. Line 1110 illustrates a growth projection at time=40 units. Line 1112 illustrates a growth projection at time=50 units. Line 1114 illustrates a growth projection at time=60 units. Line 1116 illustrates a growth projection at time=70 units. Line 1118 illustrates a growth projection at time=80 units. Line 1120 illustrates a growth projection at time=90 units. Line 1122 illustrates a growth projection at time=100 units.

The nature of the change in surface attribute within the local environment will ultimately determine the pattern of progression over time (or other domain). For example, if there is a wall-type obstruction in (x, y) in close proximity to the attribute, then the above figures could render something like what is given below. In this scenario there is a hard boundary at y=–40. Particular growth patterns at the wall interface in the x direction depend on material interactions between the wall and surface attribute; no special interactions have been assumed in this figure. Other possible results are obvious, given the shapes and positions of the obstructions.

Given the preceding development, it is evident and is claimed that a sigmoid-based approach employing single and multiple rate expressions written over (x, y, z) can be used to (i) diagnose the underlying surface processes that affect surface morphology using a regression scheme, and (ii) that once such diagnostics have been accomplished the sigmoid mathematics can then be used to predict behavior of surface attributes over the chosen domain(s). When the domain is time, this permits direct prediction of aging behavior of surface morphology. We adopt the sigmoid forms here for the sake of robustness, simplicity, and accuracy. Other non-sigmoid rate expressions could be used instead of, or in combination with, sigmoid forms.

In practice, this sigmoidal-based approach supports synthesis/emulation of morphological changes (SEMC) through physics-based mechanistic algorithms, as represented in element 220 in FIG. 2. This capability is used to match or diagnose mechanisms with observed morphological behavior, typically over time. Adaptive and prognostic learning (element 210 in FIG. 2) can draw from SEMC to predict future trends of surface morphology attributes. Once sigmoidal mathematical rate expressions (or other types) are known from SEMC, they can be used to project future trends in the chosen surface/image features. This can be used to synthesize an unlimited number of fates for materials undergoing various and numerous conditions of manufacture and aging, and thus has obvious value toward process optimization for materials production as well as optimizing lifetime conditions for materials utilization within an intended application.

Although the present invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method of performing projectional morphological analysis, the method comprising:
   supplying a first N-dimensional input image (f) representative of a scene of a field of view;
   defining non-intersecting subsets (A) from the first N-dimensional input image (f) in which points have a constant brightness value (C) within its respective subset (A), a union of the non-intersecting subsets (A) denoted as set X;
   supplying a second N-dimensional input image (g) representative of the scene of the field of view taken under different conditions, the second N-dimensional input image (g) also defined by the set X having the same defined non-intersecting subsets (A) to denote an N-dimensional form ($V_g$) of the second N-dimensional input image (g);
   computing an average brightness for each subset (A) of the N-dimensional form ($V_g$) to generate a morphological projection image (g'); and
   generating an N-dimensional output signal indicating a morphological difference of the first N-dimensional input image (f) and the second N-dimensional input image (g) by subtracting morphological projection image (g') from the second N-dimensional input image (g).

2. The method of claim 1, wherein the first N-dimensional input image (f) is a 2-dimensional image, the second N-dimensional input image (g) is a 2-dimensional image, the N-dimensional form ($V_g$) is a 2-dimensional image, and the N-dimensional output signal is a 2-dimensional image.

3. The method of claim 1, wherein the first N-dimensional input image (f) is a 3-dimensional image, the second N-dimensional input image (g) is a 3-dimensional image, the N-dimensional form ($V_g$) is a 3-dimensional image, and the N-dimensional output signal is a 3-dimensional image.

4. The method of claim 1, further comprising a change identification process including at least one of synthesis of morphological changes or emulation of morphological changes using physics-based algorithms to match or diagnose mechanisms of observed morphological behavior between the second N-dimensional input image (g) and additional N-dimensional input images to determine additional N-dimensional forms for use in the computing.

5. The method of claim 4, further comprising a learning process including at least one of an adaptive learning capability or a prognostic learning capability that uses the change identification process to predict future trends of surface morphology.

6. The method of claim 5, wherein the learning process is configured to operate in substantially real-time within a computing system to determine substantially real-time change in images of a surface of an object, the images represented by the second N-dimensional input image (g) and the additional N-dimensional input images; and further comprising modifying material production of the object responsive to the substantially real-time learning process, wherein substantially real-time is within four seconds.

7. The method of claim 1, wherein the acts of identifying the N-dimensional form ($V_g$) computing the average brightness value, and generating the N-dimensional output image signal are performed with a static library of computing algorithms identified for analysis of existing data comprising the second N-dimensional input image (g).

8. The method of claim 1, wherein the acts of identifying the at least one N-dimensional form ($V_g$), filtering the N-dimensional input image (g), and generating the N-dimensional output signal is performed with a static library of computing algorithms identified for analysis of existing data and performed at least one additional time with a dynamic library of computing algorithms that adapt to information from additional N-dimensional input images.

9. The method of claim 1, further comprising increasing a confidence level in the projectional morphological analysis using statistical analyses of results of the projectional morphological analysis from a plurality of N-dimensional signals used as the N-dimensional input images to the projectional morphological analysis.

10. A computing system for performing projectional morphological analysis, comprising:

a memory configured for storing computing instructions; and a processor operably coupled to the computing system and configured for executing the computing instructions to perform a projection morphological analysis by:

inputting a first N-dimensional input image (f) representative of a scene of a field of view;

defining non-intersecting subsets (A) from the first N-dimensional input image (f) in which points have a constant brightness value (C) within its respective subset (A), a union of the non-intersecting subsets (A) denoted as set X;

inputting second N-dimensional input image (g) representative of the scene of the field of view taken under different conditions, the second N-dimensional input image (g) also defined by the set X having the same defined non-intersecting subsets (A) to denote an N-dimensional form ($V_g$) of the second N-dimensional input image (g);

determining an N-dimensional form ($V_g$) of the second N-dimensional input image (g) including a concatenation of the non-intersecting subsets (A) defined by the first N-dimensional input image (f) that have constant brightness values within each respective non-intersecting subset (A);

generating a morphological projection image (g') by processing the second N-dimensional input image (g) relative to the N-dimensional form ($V_g$) by taking a difference of a brightness value of each of the points of the N-dimensional signal (g) relative to an average of the brightness value of the N-dimensional form ($V_g$) within its respective non-intersecting subset (A); and generating an N-dimensional output signal indicating a morphological difference of the first N-dimensional input image (f) and the second N-dimensional input image (g) by subtracting morphological projection image (g') from the second N-dimensional input image (g).

11. The computing system of claim 10, wherein the first N-dimensional input image (f) is a 2-dimensional image, the second N-dimensional input image (g) is a 2-dimensional image, the N-dimensional form ($V_g$) is a 2-dimensional image, and the N-dimensional output signal is a 2-dimensional image.

12. The computing system of claim 10, wherein the first N-dimensional input image (f) is a 3-dimensional image, the second N-dimensional input image (g) is a 3-dimensional image, the N-dimensional form ($V_g$) is a 3-dimensional image, and the N-dimensional output signal is a 3-dimensional image.

13. The computing system of claim 10, further comprising a change identification software module including computing instructions to perform at least one of synthesis of morphological changes or emulation of morphological changes using physics-based algorithms to match or diagnose mechanisms of observed morphological behavior between the N-dimensional input image (g) and additional N-dimensional input images to determine additional N-dimensional forms for use in the filtering.

14. The computing system of claim 13, further comprising a learning software module including computing instructions to perform at least one of an adaptive learning capability or a prognostic learning capability that uses the change identification software module to predict future trends of surface morphology.

15. The computing system of claim 14, wherein the learning software module is configured to operate in substantially real-time to determine substantially real-time change in images of a surface of an object, the images represented by the N-dimensional input image (g) and the additional N-dimensional input images, and further comprising modifying material production of the object responsive to the substantially real-time learning process, wherein substantially real-time is within four seconds.

16. The computing system of claim 10, wherein determining the at least one N-dimensional form ($V_g$), generating a morphological projection image (g'), and generating the N-dimensional output signal are performed with a static library of computing algorithms identified for analysis of existing data comprising the second N-dimensional input image (g).

17. The computing system of claim 10, wherein determining the at least one N-dimensional form ($V_g$), generating a morphological projection image (g'), and generating the N-dimensional output signal are performed with a static library of computing algorithms identified for analysis of existing data and performed at least one additional time with a dynamic library of computing algorithms that adapt to information from additional N-dimensional input images.

18. Non-transitory computer-readable media including computer executable instructions, which when executed on a processor perform acts, comprising:

determining an N-dimensional form ($V_g$) of a second N-dimensional input image (g) including a concatenation of non-intersecting subsets (A) defined by a first N-dimensional input image (f) according to constant brightness values (C) within its respective non-intersecting subset (A) of the first N-dimensional input image (f);

determining an N-dimensional form ($V_g$) of the second N-dimensional input image (g) by processing the second N-dimensional input image (g) relative to the N-dimensional form ($V_g$) by taking a difference of a brightness value of the each of the points of the N-dimensional signal (g) relative to the an average brightness values of the N-dimensional form ($V_g$) within its respective non-intersecting subset (A); and generating an N-dimensional output signal indicating a morphological difference of the first N-dimensional input image (f) and the second N-dimensional input image (g) by subtracting morphological projection image(g') from the second N-dimensional input image (g).

19. The non-transitory computer-readable media of claim 18, wherein the first N-dimensional input image (f) is a 2-dimensional image, the second N-dimensional input image (g) is a 2-dimensional image, the N-dimensional form ($V_g$) is a 2-dimensional image, and the N-dimensional output signal is a 2-dimensional image.

20. The non-transitory computer-readable media of claim 18, further comprising a change identification software module including computer executable instructions to perform at least one of synthesis of morphological changes or emulation of morphological changes using physics-based algorithms to match or diagnose mechanisms of observed morphological behavior between the N-dimensional input image (g) and additional N-dimensional input images to determine additional N-dimensional forms for use in the filtering.

21. The non-transitory computer-readable media of claim 20, further comprising a learning software module including computer executable instructions to perform at least one of an adaptive learning capability or a prognostic learning capability that uses the change identification software module to predict future trends of surface morphology.

22. The non-transitory computer-readable media of claim 21, wherein the learning software module can operate in substantially real-time to determine substantially real-time change in images of a surface of an object, the images represented by the N-dimensional input image (g) and the additional N-dimensional input images, and further comprising modifying material production of the object responsive to the substantially real-time learning process, wherein substantially real-time is within four seconds.

* * * * *